US010829098B2

(12) United States Patent
Perlick et al.

(10) Patent No.: US 10,829,098 B2
(45) Date of Patent: Nov. 10, 2020

(54) AUTOMATIC DOWNHILL SNUB BRAKING

(71) Applicant: Ford Global Technologies, LLC, Dearborn, MI (US)

(72) Inventors: Donald A. Perlick, Farmington Hills, MI (US); Bang Kim Cao, Northville, MI (US); Kurt Howard Nickerson, Shelby Township, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 113 days.

(21) Appl. No.: 16/036,577

(22) Filed: Jul. 16, 2018

(65) Prior Publication Data

US 2020/0017078 A1   Jan. 16, 2020

(51) Int. Cl.
  *B60T 7/12*  (2006.01)
  *B60T 8/17*  (2006.01)
  *B60W 10/11*  (2012.01)
  *B60W 30/14*  (2006.01)
  *B60W 10/184*  (2012.01)

(52) U.S. Cl.
  CPC ............ *B60T 7/12* (2013.01); *B60T 8/1708* (2013.01); *B60W 10/11* (2013.01); *B60W 10/184* (2013.01); *B60W 30/143* (2013.01); *B60T 2201/02* (2013.01); *B60T 2201/04* (2013.01); *B60W 2552/15* (2020.02)

(58) Field of Classification Search
  None
  See application file for complete search history.

(56) References Cited

U.S. PATENT DOCUMENTS

| 8,731,795 | B2 | 5/2014 | Frashure et al. | |
|---|---|---|---|---|
| 2005/0125137 | A1* | 6/2005 | Shiiba | B60K 31/0008 701/96 |
| 2010/0125399 | A1* | 5/2010 | Grolle | B60W 10/06 701/96 |
| 2012/0089313 | A1* | 4/2012 | Frashure | B60T 7/042 701/94 |
| 2014/0156163 | A1* | 6/2014 | Shin | B60W 10/184 701/94 |
| 2015/0027823 | A1* | 1/2015 | Murata | F16D 65/14 188/162 |
| 2015/0134224 | A1 | 5/2015 | Vaughan | |

(Continued)

FOREIGN PATENT DOCUMENTS

| JP | H09207613 | 8/1997 |
|---|---|---|
| JP | 2016088179 | 5/2016 |

(Continued)

*Primary Examiner* — Dale W Hilgendorf
*Assistant Examiner* — Alexander C. Bost
(74) *Attorney, Agent, or Firm* — Ray Coppiellie; Hanley, Flight & Zimmerman, LLC (57) ABSTRACT

Methods and apparatus are disclosed herein that perform automatic downhill snub braking. An example apparatus disclosed herein includes an electronic powertrain controller to cause a deceleration of a vehicle in response to a first request from an electronic cruise controller, the first request responsive to a change in grade of a driving surface and an electronic brake controller to apply snub braking to the vehicle in response to a second request received from the electronic cruise controller, the second request responsive to a speed of the vehicle reaching a maximum speed.

20 Claims, 6 Drawing Sheets

(56) References Cited

U.S. PATENT DOCUMENTS

2015/0336548 A1\* 11/2015 Morselli ............... B60T 8/1708
  701/70
2017/0297573 A1 10/2017 Fraser et al.

FOREIGN PATENT DOCUMENTS

WO 2017036492 3/2017
WO WO-2017036492 A1 \* 3/2017 .............. B60T 8/171

\* cited by examiner

AUTOMATIC DOWNHILL SNUB BRAKING

FIELD OF THE DISCLOSURE

This disclosure relates generally to vehicle braking systems and, more particularly, to automatic downhill snub braking.

BACKGROUND

When large trucks (e.g., tractor-trailers) and/or other vehicles descend a steep or long grade, braking systems are put under high stresses while attempting to maintain the truck or other vehicle at a safe driving speed. If a driver applies steady braking down the entirety of the grade, the brakes approach high temperatures that can reduce the braking effectiveness. As such, applying constant braking down a hill or grade is undesirable. However, a preferred method of braking, called snub braking, prevents brake temperatures from increasing to undesirably high levels when used. Snub braking is thus taught to drivers of tractor-trailers and other large commercial vehicles and implemented to increase safety.

The figures are not to scale. Instead, the thickness of the layers or regions may be enlarged in the drawings. In general, the same reference numbers will be used throughout the drawing(s) and accompanying written description to refer to the same or like parts. As used in this patent, stating that any part (e.g., a layer, film, area, region, or plate) is in any way on (e.g., positioned on, located on, disposed on, or formed on, etc.) another part, indicates that the referenced part is either in contact with the other part, or that the referenced part is above the other part with one or more intermediate part(s) located therebetween. Stating that any part is in contact with another part means that there is no intermediate part between the two parts. Although the figures show layers and regions with clean lines and boundaries, some or all of these lines and/or boundaries may be idealized. In reality, the boundaries and/or lines may be unobservable, blended, and/or irregular.

DETAILED DESCRIPTION

Snub braking is a braking technique used to reduce the temperature of a braking system when driving a truck, tractor-trailer, or other vehicle downhill. Snub braking includes first choosing a lowest possible gear in which to descend the hill. Shifting to a lower gear increases engine braking, wherein the engine of the vehicle applies a retarding force to slow down the vehicle without using the braking system (e.g., friction brakes). Snub braking further includes a large deceleration using the braking system (e.g., by depressing the brake pedal) when the vehicle speeds up to a maximum speed. The large deceleration is applied for a short duration, following which the truck is allowed to again reach the maximum speed. The large deceleration is applied each time the vehicle reaches the maximum speed until the vehicle reaches the bottom of the grade.

Figure 1:
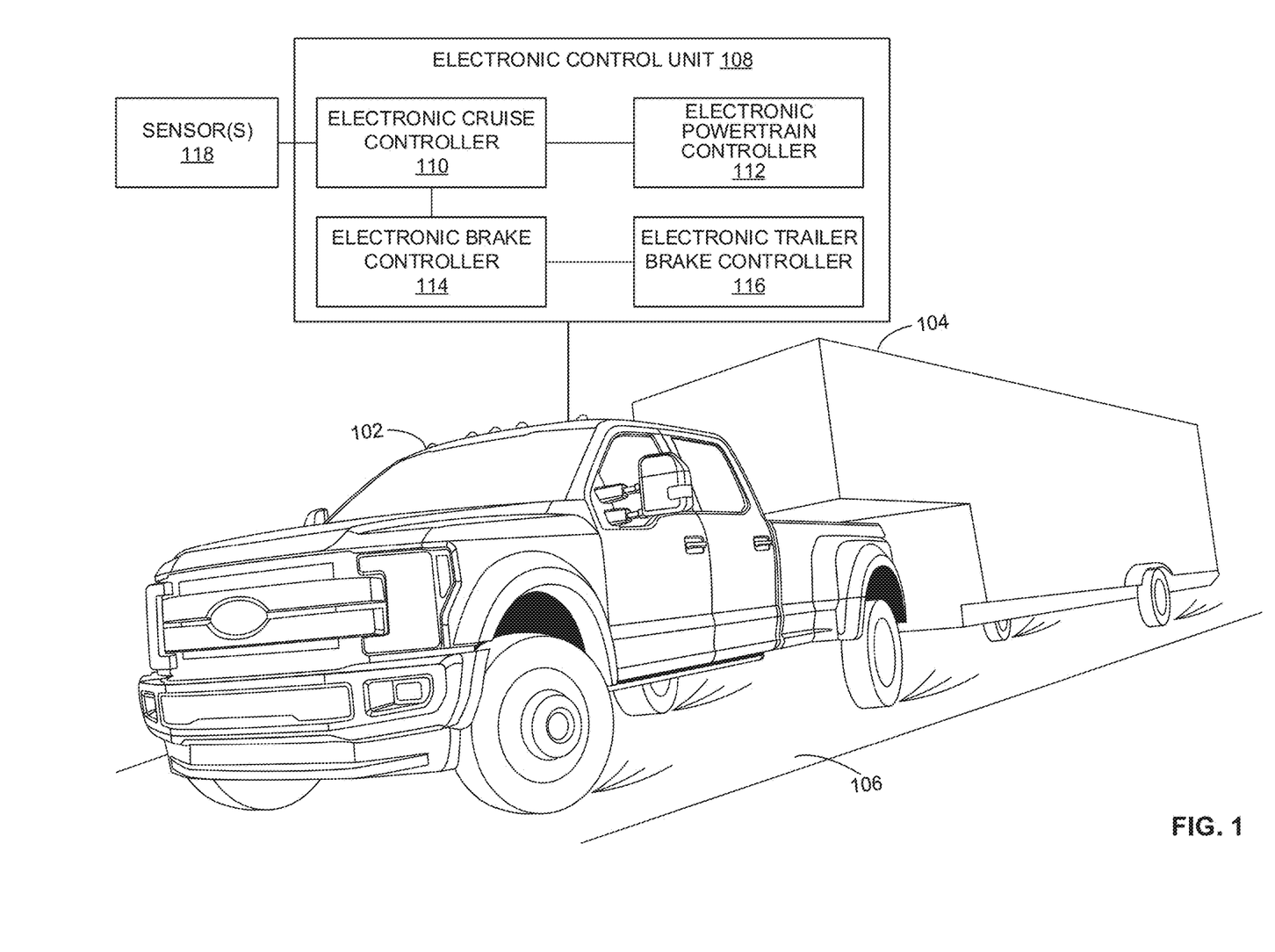
FIG. 1 is a schematic illustration of an example vehicle that may implement the teachings of this disclosure.

Snub braking has been shown to greatly reduce the peak temperature of the braking system, thereby increasing the effectiveness and safety of the braking system. However, most non-commercial drivers have not been taught snub braking techniques. As non-commercial trucks and/or other vehicles have become capable of towing increasingly heavy loads, the need for use of proper braking techniques for these vehicles has increased. Thus, there is a need to implement automatic snub braking that utilizes the techniques of snub braking for untrained drivers of non-commercial vehicles. By implementing automatic snub braking, operation of trucks carrying substantial loads and/or towing trailers on large downhill terrain (e.g., mountain roads) will not produce excessive wear on the brakes and, further, can increase braking effectiveness and increase the longevity of braking systems FIG. 1 is a schematic illustration of an example vehicle 102 that may implement the teachings of this disclosure. In the illustrated example, the vehicle 102 is a truck. In other examples, the vehicle 102 could instead be a car, SUV, highway tractor, etc. In the illustrated example, the vehicle 102 includes an example trailer 104 attached to the vehicle 102. The vehicle 102 is towing the trailer 104 down an example grade 106. As the vehicle 102 descends the grade 106, the speed of travel of the vehicle 102 increases, thus putting added strain on the braking system of the vehicle 102 to maintain safe a speed (e.g., if constant braking is applied).

The vehicle 102 further includes an example electronic control unit 108 to implement automatic snub braking. The electronic control unit 108 includes an example electronic cruise controller 110, an example electronic powertrain controller 112, an example electronic brake controller 114, and an example electronic trailer brake controller 116. The electronic control unit 108 receives inputs from one or more example sensors 118.

In operation, the electronic cruise controller 110 performs known cruise control operations (e.g., maintaining vehicle speed by accelerating and/or decelerating the vehicle 102). However, the electronic cruise controller 110 is also capable of operating in a snub braking mode when the vehicle 102 is descending the grade 106, as it is in the example of FIG. 1. The electronic cruise controller 110 is communicatively coupled to the electronic powertrain controller 112 and the electronic brake controller 114. The electronic powertrain controller 112 detects that the vehicle 102 is descending the grade 106 and transmits this information to the electronic cruise controller 110. Additionally or alternatively, an anti-lock braking system (ABS) can detect that the vehicle 102 is descending the grade 106. In some such examples, the ABS transmits information regarding the grade 106 to the electronic powertrain controller 112 and/or the electronic cruise controller 112. The electronic cruise controller 110 then switches its operational mode to the snub braking mode. In some examples, the electronic cruise controller 110 switches to snub braking mode automatically when the grade 106 is detected. In other examples, the electronic cruise controller 110 is switched to snub braking mode by a driver of the vehicle 102 (e.g., by a switch or button).

The electronic powertrain controller 112 receives instructions from the electronic cruise controller 110 to perform braking or retarding techniques for the vehicle 102. In some examples, the electronic cruise controller 110 instructs the electronic powertrain controller 112 to perform a transmission downshift. In some examples, the electronic cruise controller 110 instructs the electronic powertrain controller 112 to perform engine braking to slow the vehicle 102. The electronic powertrain controller 112 performs these actions either independently or simultaneously when instructed by the electronic cruise controller 110.

The electronic cruise controller 110 is further communicatively coupled to the electronic brake controller 114. The electronic cruise controller 110 transmits instructions to the electronic brake controller 114 to apply one or more snub braking events via a braking system of the vehicle 102. As used herein, a snub braking event refers to an application of the brakes of the vehicle 102 for a particular duration of time. For example, when the speed of the vehicle 102 reaches a maximum speed, the electronic cruise controller 110 instructs the electronic brake controller 114 to apply a sharp deceleration (e.g., a brake application with a large magnitude and short duration) to slow the vehicle 102. In some examples, the snub braking is applied until the speed of the vehicle 102 reaches a speed near or equal to a specified value (e.g., 5 mph below the maximum speed, a minimum speed, etc.). In other examples, the snub braking is applied for a specified amount of time (e.g., 3 seconds, 5 seconds, etc.).

The electronic brake controller 114 is additionally communicatively coupled to the electronic trailer brake controller 116. In some examples, the electronic trailer brake controller 116 implements snub braking that mirrors the snub braking of the electronic brake controller 114. For example, the electronic trailer brake controller 116 implements snub braking via a trailer braking system that slows the trailer at the same rate as the vehicle 102. In some examples, the snub braking is applied by the trailer braking system for the same duration as was applied by the braking system of the vehicle 102.

The electronic cruise controller 110 receives inputs from the sensors 118 and uses these inputs to determine the instructions to be provided to the electronic powertrain controller 112 and/or the electronic brake controller 114. For example, the electronic cruise controller 110 receives speed data from an example speedometer of the vehicle 102. In other examples, the electronic cruise controller 110 receives brake temperature data, brake performance data, engine braking performance data, and/or trailer brake performance information.

Figure 2:
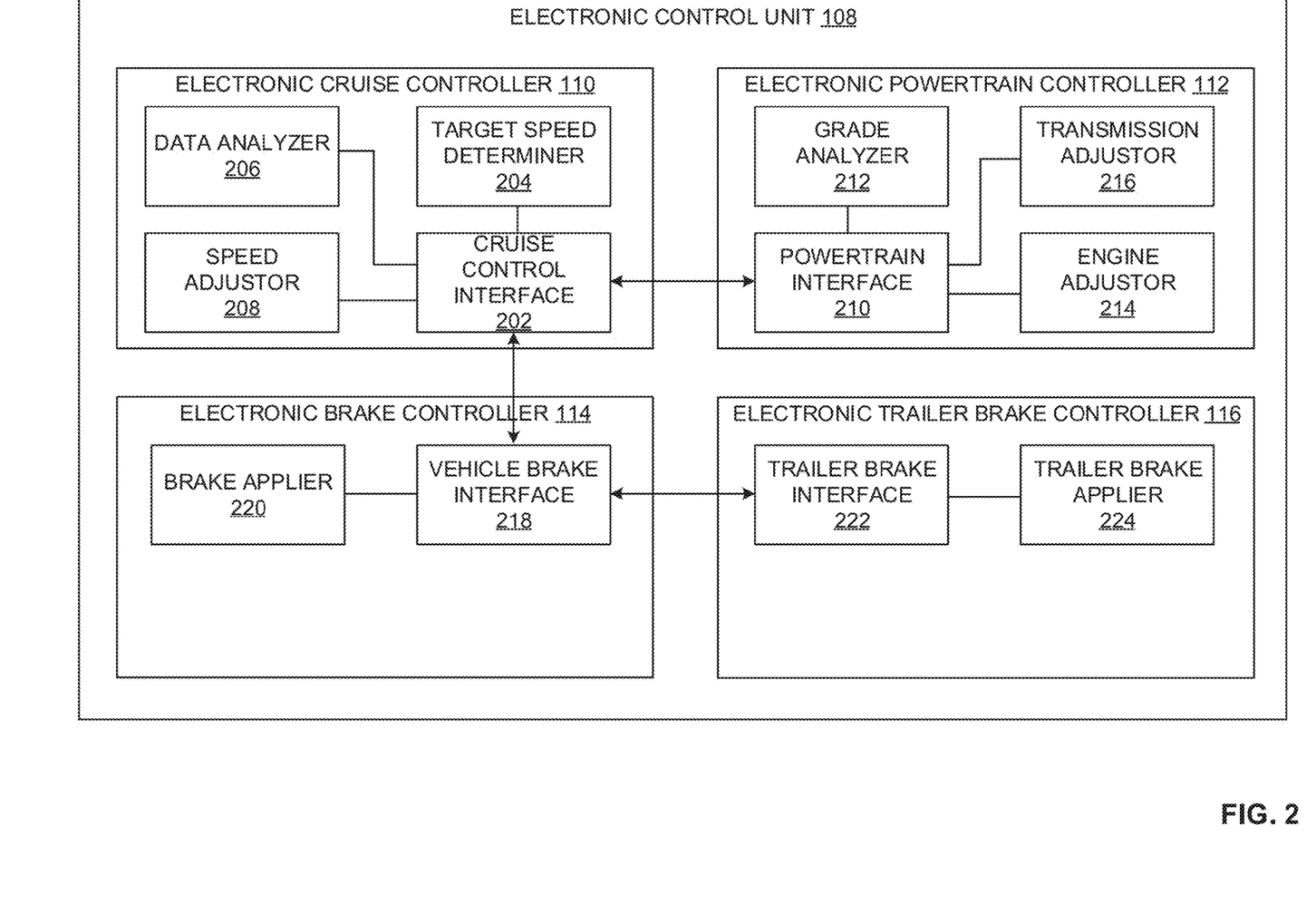
FIG. 2 is a block diagram of an example implementation of the example electronic control unit of FIG. 1.

FIG. 2 is a block diagram of an example implementation of the electronic control unit 108 of FIG. 1. The electronic control unit 108 includes the electronic cruise controller 110 of FIG. 1, the electronic powertrain controller 112 of FIG. 1, the electronic brake controller 114 of FIG. 1, and the electronic trailer brake controller 116 of FIG. 1. The electronic cruise controller 110 includes an example cruise control interface 202, an example target speed determiner 204, an example data analyzer 206, and an example speed adjustor 208. The electronic powertrain controller 112 includes an example powertrain interface 210, an example grade analyzer 212, an example engine adjustor 214, and an example transmission adjustor 216. The electronic brake controller 114 includes a vehicle brake interface 218 and an example brake applier 220. The electronic trailer brake controller 116 includes an example trailer brake interface 222 and an example trailer brake applier 224.

In operation, the cruise control interface 202 communicatively couples the electronic cruise controller 110 to the electronic powertrain controller 112 via the powertrain interface 210 and communicatively couples the electronic cruise controller 110 to the electronic brake controller 114 via the vehicle brake interface 218. The cruise control interface 202 receives grade information regarding the grade (e.g., the grade 106 of FIG. 1) of a driving surface from the powertrain interface 210. Additionally or alternatively, the cruise control interface 202 can receive grade information determined by an ABS of a vehicle (e.g., the vehicle 102 of FIG. 1). The grade analyzer 212 determines that the vehicle 102 is traveling on a grade and outputs the grade information to the powertrain interface 210. In some examples, the grade analyzer 212 outputs the grade information when the driving surface is a downhill driving surface. In some examples, the grade analyzer 212 outputs the grade information when the grade passes a threshold grade (e.g., 5% grade, 8% grade, etc.) indicative of a hill steep enough that snub braking is needed to descend the hill. The powertrain interface 210 transmits the grade information to the cruise control interface 202.

Upon receiving the grade information at the cruise control interface 202, the electronic cruise controller 110 determines whether downhill snub braking mode should be utilized for the descent. In some examples, the electronic cruise controller 110 utilizes downhill snub braking mode when the grade 106 is determined to be above the threshold (e.g., 5%, 8%, etc.). Alternatively, in some examples the electronic cruise controller 110 utilizes downhill snub braking mode when any level of downhill grade is indicated by the grade information.

In downhill snub braking mode, the target speed determiner 204 sets an acceptable speed range based on a target speed. In some examples, the target speed is set by a driver of the vehicle 102. In some alternative examples, the target speed is set automatically to a predetermined speed when the vehicle 102 is in downhill snub braking mode (e.g., the target speed is set to a predetermined speed known to be a safe driving speed on a grade). The target speed determiner 204 further sets the acceptable speed range based on the target speed. In some examples, the target speed determiner 204 sets the target speed as the maximum speed of the acceptable speed range and sets the minimum speed as a predetermined value below the maximum speed (e.g., 10 mph, 5 mph, etc.). In some examples, the target speed determiner 204 sets the maximum speed of the acceptable speed range as a predetermined value above the target speed (e.g., 5 mph above) and sets the minimum speed of the acceptable speed range as a predetermined value below the target speed (e.g., 5 mph below).

When the target speed determiner 204 sets the acceptable speed range based on the target speed, the electronic cruise controller 110 monitors the speed of the vehicle 102. For example, the sensors 118 of FIG. 1 can include a speedometer that transmits speed information to the cruise control interface 202 of the electronic cruise controller 110. The cruise control interface 202 transmits the speed information to the data analyzer 206, and the data analyzer 206 determines the actions to be taken in response to the speed of the vehicle 102.

The data analyzer 206 compares the vehicle speed (e.g., given by the speed information) to the acceptable speed range set by the target speed determiner 204. When the speed of the vehicle 102 is below the minimum speed of the acceptable range, the data analyzer 206 determines that the speed should be increased by the speed adjustor 208 until the minimum speed is reached. For example, the speed adjustor 208 determines that the vehicle 102 must accelerate (e.g., by adjusting a throttle of the vehicle 102) to increase the vehicle speed to within the acceptable speed range. After the speed adjustor 208 increases the vehicle speed, the speed adjustor 208 maintains the vehicle speed at the minimum speed of the acceptable speed range.

As the vehicle 102 descends the grade 106, the speed of the vehicle 102 can increase without use of the throttle. In such examples, the data analyzer 206 continues to monitor the vehicle speed and transmits instructions to the electronic powertrain controller 112 and/or electronic brake controller 114 via the cruise control interface 202. When the speed of the vehicle 102 increases above the minimum speed of the acceptable speed range, the data analyzer 206 detects the increase and transmits instructions to the electronic powertrain controller 112. The instructions include directing the engine adjustor 214 to initiate engine fuel cutoff and/or directing the transmission adjustor 216 to shift a transmission of the vehicle 102 into a lower gear.

In some examples, the data analyzer 206 transmits instructions to the powertrain interface 210 (e.g., via the cruise control interface 202) instructing the engine adjustor 214 to cut off fuel intake to the engine. Cutting off fuel intake causes engine braking wherein the engine of the vehicle 102 causes a retarding force to slow down the vehicle without using a friction braking system of the vehicle 102. Engine braking differs between gasoline and diesel engines, and therefore the type of engine braking is dependent on the engine of the vehicle 102. In gasoline engines, as fuel is cut off from the engine via a throttle body (e.g., a butterfly valve regulating an amount of air that flows into an engine), a vacuum is created within an intake manifold during an intake stroke. As a piston of the engine attempts to pull air in through the intake manifold on the intake stroke, the pistons work against the vacuum, which creates the braking force. In a diesel engine, a throttle body on an exhaust side creates back-pressure by causing a restriction in the exhaust. The back-pressure provides a retarding force that causes the braking force. In some examples, a diesel engine that is equipped with a turbocharger includes adjustable vanes in a turbocharger turbine housing. The adjustable vanes restrict exhaust flow, creating back-pressure to provide a retarding force.

The data analyzer 206 further determines if the transmission will allow a downshift into a next lower gear. If the data analyzer 206 determines that a downshift is possible, the data analyzer 206 transmits instructions to the transmission adjustor 216 to shift the transmission of the vehicle 102 to a lower gear. The transmission adjustor 216 is communicatively coupled to the transmission of the vehicle 102 and causes the transmission to downshift when instructed by the data analyzer 206.

In some examples, the data analyzer 206 determines the instructions that are to be sent to the electronic powertrain controller 112 based on the speed of the vehicle 102 in relation to the acceptable speed range. The data analyzer 206 of the illustrated example determines a first threshold value above the minimum speed of the acceptable speed range. When the speed of the vehicle 102 is above the minimum speed of the acceptable speed range and below the first threshold value, the data analyzer 206 determines that one or both of the engine fuel cutoff and/or the downshifting of the transmission should be performed.

In some examples, the first threshold value is set to a value below the maximum speed of the acceptable speed range. As the speed of the vehicle 102 increases above the first threshold value, the data analyzer 206 determines that the electronic powertrain controller 112 cannot maintain the speed of the vehicle 102 within the acceptable speed range using only engine fuel cutoff and/or downshifting the transmission. Thus, when the vehicle speed is between the first threshold speed value and the maximum speed of the acceptable range, the data analyzer 206 transmits instructions to the electronic brake controller 114 to initiate a snub braking event.

The data analyzer 206 transmits instructions to the vehicle brake interface 218 via the cruise control interface 202 directing the brake applier 220 to request a level of deceleration for the snub braking event. In some examples, the data analyzer 206 determines the level of deceleration based on the vehicle speed and/or the grade 106. When the brake applier 220 receives the instructions from the data analyzer 206, it directs the brake system of the vehicle 102 to perform a snub braking event to decelerate the vehicle 102. In some examples, the snub braking event is a short (e.g., five seconds or less), forceful application of the vehicle brakes. In some examples, the snub braking event is applied as a 0.25 g braking event. Additionally or alternatively, the braking event can be greater or less than 0.25 g. The brake applier 220 of the illustrated example performs the snub braking event until the speed of the vehicle 102 reaches the minimum speed of the speed range. Additionally or alternatively, the brake applier 220 may perform the snub braking event until the data analyzer 206 determines that the transmission can shift to a lower gear via the transmission adjustor 216. In some examples, the brake applier 220 gradually reduces the braking forces exerted as the speed of the vehicle 102 approaches the minimum speed.

The vehicle brake interface 218 of the illustrated example is further communicatively coupled to the trailer brake interface 222. The vehicle brake interface 218 transmits the instructions from the data analyzer 206 to the trailer brake applier 224 via the trailer brake interface 222. The trailer brake applier 224 performs the snub braking event to a braking system of a trailer attached to the vehicle. In some examples, the trailer brake applier 224 implements a braking force via the trailer braking system that decelerates the trailer at the same rate as the vehicle 102. In some examples, the trailer brake applier 224 implements the snub braking for the same duration as the snub braking implemented by the brake applier 220. In some examples, no trailer is attached to the vehicle 102 and therefore the electronic trailer brake controller 116 is not used during operation of the electronic control unit 108.

After a snub braking event, the data analyzer 206 continues to monitor the speed of the vehicle 102 and transmits instructions to the electronic powertrain controller 112 and/or the electronic brake controller 114 depending on the vehicle speed and/or any change in the grade 106. In some examples, the data analyzer 206 determines a maximum grade downshift velocity. The maximum grade downshift velocity is a maximum speed at which the transmission allows a downshift into the next lower gear. In some examples, the data analyzer 206 determines the first threshold value based on the maximum grade downshift velocity. In some examples, the data analyzer 206 determines the minimum speed of the speed range based on the maximum grade downshift velocity (e.g., by setting the minimum speed at a value below (e.g., 2 or 3 mph) the maximum grade downshift velocity). In some examples, the brake applier 220 performs the snub braking event until the speed of the vehicle 102 reaches the maximum grade downshift velocity or a speed just below the maximum grade downshift velocity. In such examples, after the snub braking event, the data analyzer 206 instructs the transmission adjustor 216 to downshift into the next lowest gear. Thus, the maximum grade downshift velocity determined by the data analyzer 206 is used to optimize the engine braking caused by downshifting the transmission. The electronic cruise controller 110 continues to operate in downhill snub braking mode until the grade analyzer 212 provides grade information to the data analyzer 206 that indicates the electronic cruise controller 110 should return to a standard operating mode.

In some examples, the electronic cruise controller 110 returns to the standard operating mode based on input from a global positioning system (GPS). For example, the GPS can determine whether the vehicle 102 has descended a final grade on a particular road (e.g., using a map) and transmit this information to the electronic cruise controller 110. In such an example, the electronic cruise controller 110 returns to operating in the standard operating mode. In some other examples, the electronic cruise controller 110 returns to standard operating mode when the GPS determines that the vehicle 102 will not encounter a downhill for a predetermined distance, amount of time, etc.

While an example manner of implementing the electronic control unit 108 of FIG. 1 is illustrated in FIG. 2, one or more of the elements, processes and/or devices illustrated in FIG. 2 may be combined, divided, re-arranged, omitted, eliminated and/or implemented in any other way. Further, the cruise control interface 202, the example target speed determiner 204, the example data analyzer 206, the example speed adjustor 208, the example powertrain interface 210, the example grade analyzer 212, the example engine adjustor 214, the example transmission adjustor 216, the example vehicle brake interface 218, the example brake applier 220, the example trailer brake interface 222, the example trailer brake applier 224, the example electronic cruise controller 110, the example electronic powertrain controller 112, the example electronic brake controller 114, the electronic trailer brake controller 116, and/or, more generally, the example electronic control unit 108 of FIG. 1 may be implemented by hardware, software, firmware and/or any combination of hardware, software and/or firmware. Thus, for example, any of the cruise control interface 202, the example target speed determiner 204, the example data analyzer 206, the example speed adjustor 208, the example powertrain interface 210, the example grade analyzer 212, the example engine adjustor 214, the example transmission adjustor 216, the example vehicle brake interface 218, the example brake applier 220, the example trailer brake interface 222, the example trailer brake applier 224, the example electronic cruise controller 110, the example electronic powertrain controller 112, the example electronic brake controller 114, the electronic trailer brake controller 116, and/or, more generally, the example electronic control unit 108 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the cruise control interface 202, the example target speed determiner 204, the example data analyzer 206, the example speed adjustor 208, the example powertrain interface 210, the example grade analyzer 212, the example engine adjustor 214, the example transmission adjustor 216, the example vehicle brake interface 218, the example brake applier 220, the example trailer brake interface 222, the example trailer brake applier 224, the example electronic cruise controller 110, the example electronic powertrain controller 112, the example electronic brake controller 114, the electronic trailer brake controller 116, and the electronic control unit 108 is/are hereby expressly defined to include a non-transitory computer readable storage device or storage disk such as a memory, a digital versatile disk (DVD), a compact disk (CD), a Blu-ray disk, etc. including the software and/or firmware. Further still, the example electronic control unit 108 of FIG. 1 may include one or more elements, processes and/or devices in addition to, or instead of, those illustrated in FIG. 2, and/or may include more than one of any or all of the illustrated elements, processes and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

Figure 3:
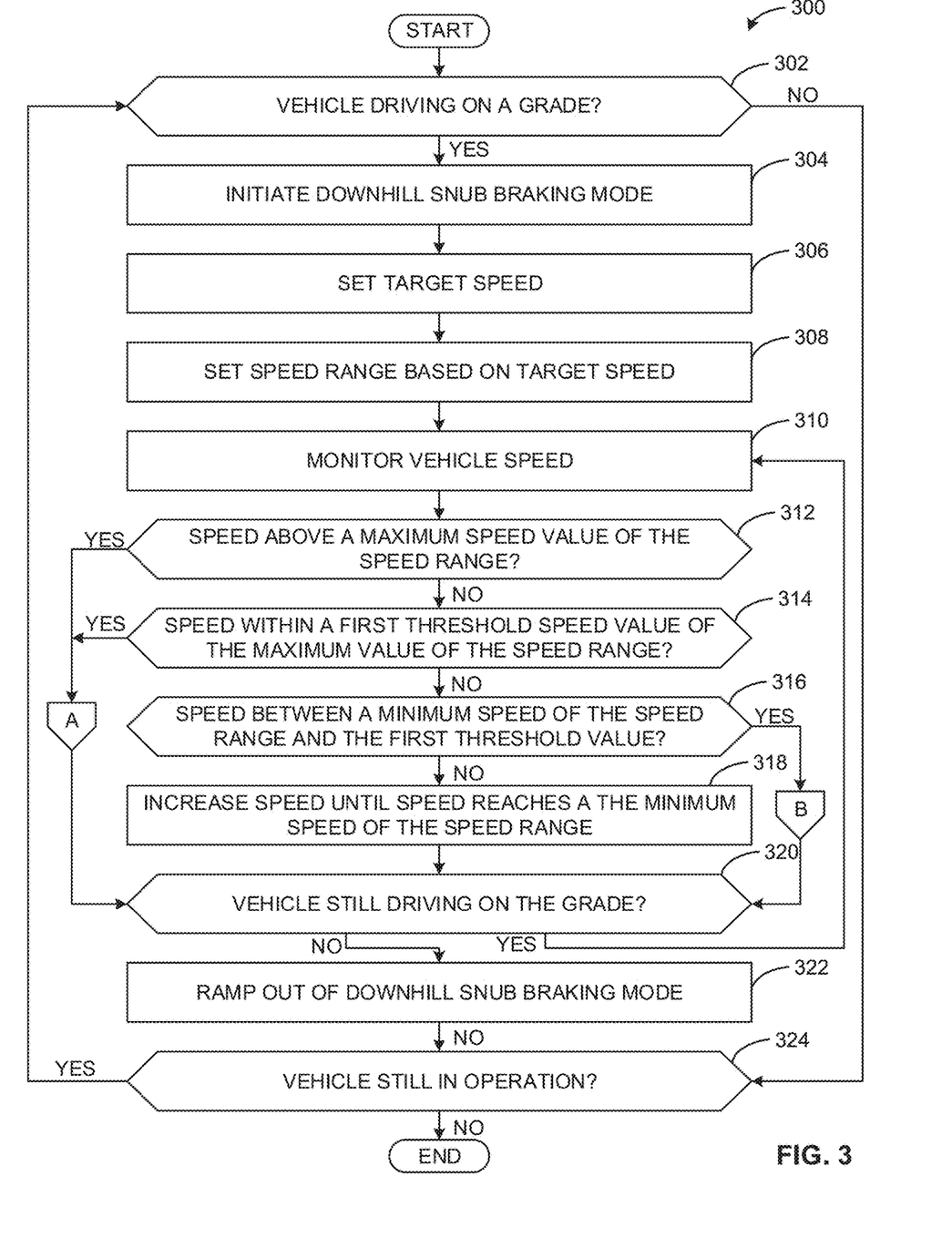
FIG. 3 is a flowchart representative of machine readable instructions that may be executed to implement the example electronic control unit of FIGS. 1-2 to initiate automatic downhill snub braking.
Figure 4A:
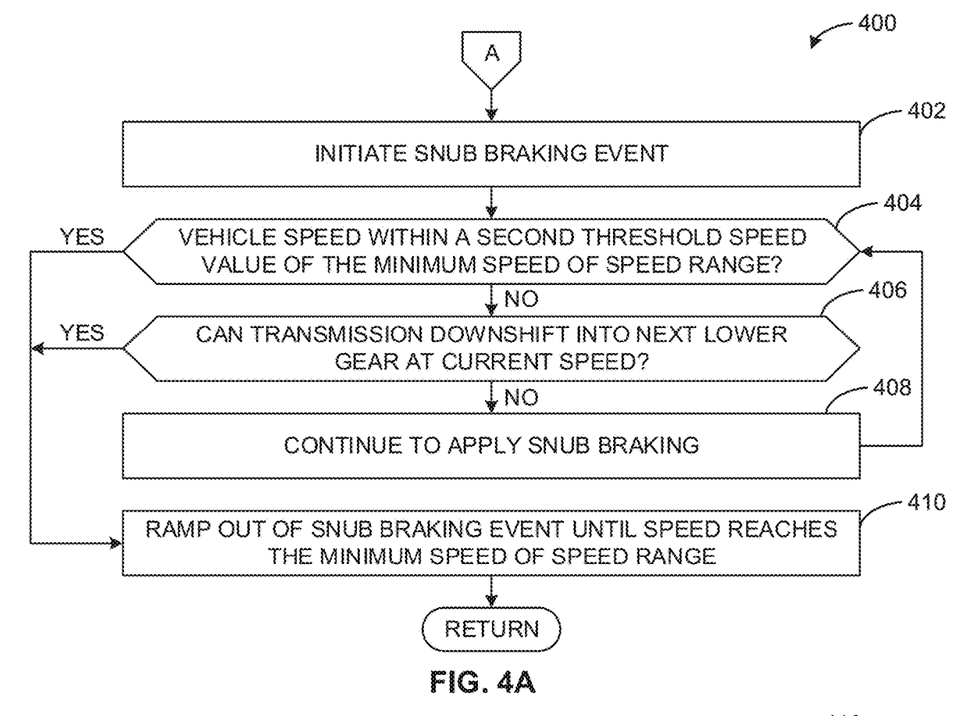
FIG. 4A is a flowchart representative of machine readable instructions that may be executed to implement the example electronic control unit of FIGS. 1-2 to apply a snub braking event.
Figure 4B:
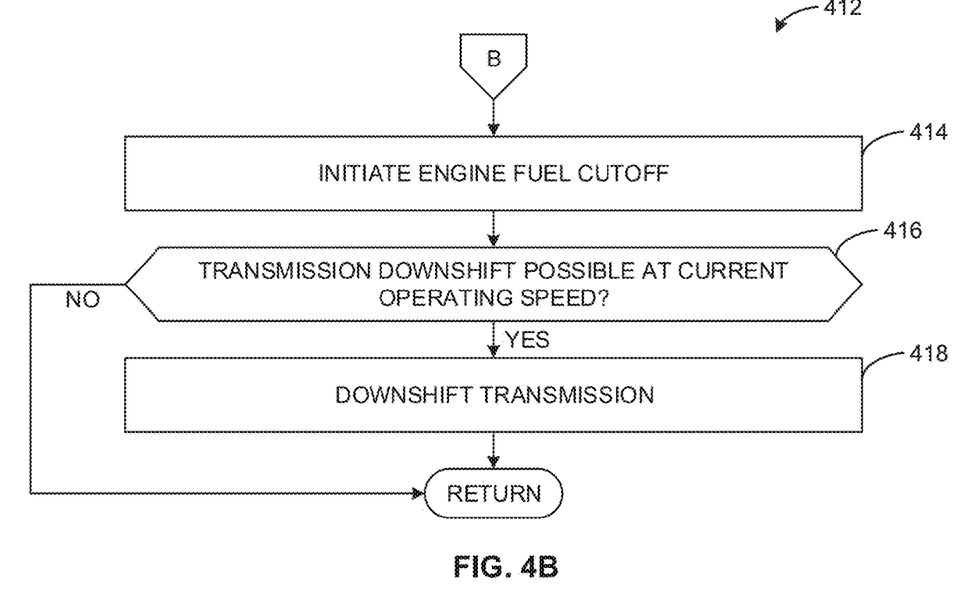
FIG. 4B is a flowchart representative of machine readable instructions that may be executed to implement the example electronic control unit of FIGS. 1-2 to decelerate the example vehicle of FIG. 1 using the example electronic powertrain controller of FIGS. 1-2.

A flowchart representative of example hardware logic, machine readable instructions, hardware implemented state machines, and/or any combination thereof for implementing the electronic control unit 108 of FIG. 1 is shown in FIGS. 3-4B. The machine readable instructions may be an executable program or portion of an executable program for execution by a computer processor such as the processor 612 shown in the example processor platform 600 discussed below in connection with FIG. 6. The program may be embodied in software stored on a non-transitory computer readable storage medium such as a CD-ROM, a floppy disk, a hard drive, a DVD, a Blu-ray disk, or a memory associated with the processor 612, but the entire program and/or parts thereof could alternatively be executed by a device other than the processor 612 and/or embodied in firmware or dedicated hardware. Further, although the example program is described with reference to the flowchart illustrated in FIGS. 3-4B, many other methods of implementing the example electronic control unit 108 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware.

As mentioned above, the example processes of FIGS. 3-4B may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C.

FIG. 3 is a flowchart representative of machine readable instructions that may be executed to implement the example electronic control unit 108 of FIGS. 1-2 to initiate automatic downhill snub braking. The program 300 of FIG. 3 begins at block 302 when the electronic control unit 108 determines whether a vehicle (e.g., the vehicle 102) is driving on a grade. For example, the grade analyzer 212 of FIG. 2 determines the grade (e.g., the grade 106 of FIG. 1) of the road surface. The example grade analyzer 212 further determines whether the grade 106 is significant (e.g., above a threshold grade value) and whether the vehicle is traveling downhill (e.g., not uphill).

At block 304, the electronic control unit 108 initiates downhill snub braking mode. For example, when the grade analyzer 212 outputs grade information indicating a significant downhill grade, the electronic cruise controller 110 of FIGS. 1-2 enters into downhill snub braking mode, wherein the electronic cruise controller 110 adjusts vehicle speed based on snub braking techniques (e.g., not techniques used by a typical cruise control).

At block 306, the electronic control unit 108 sets a target speed for the vehicle 102. For example, the target speed determiner 204 of FIG. 2 sets a target speed based on input from a driver of the vehicle 102. Additionally or alternatively, the target speed determiner 204 may set the target speed based on a predetermined downhill speed (e.g., a speed known to be safe for the vehicle 102 to travel downhill of the detected grade).

At block 308, the electronic control unit 108 sets a speed range based on the target speed. For example, the target speed determiner 204 sets a speed range using the target speed as a maximum speed of the speed range. In some examples, the target speed set at block 306 is instead a midpoint of the speed range (e.g., a minimum speed is set at 5 mph below the target speed and a maximum speed is set at 5 mph above the target speed).

At block 310, the electronic control unit 108 monitors vehicle speed of the vehicle 102. For example, the data analyzer 206 of FIG. 2 receives speed information (e.g., from a speedometer of the vehicle 102) and monitors the speed of the vehicle 102. The data analyzer 206 uses the speed information to determine the steps taken to maintain the vehicle speed within the speed range set at block 308.

At block 312, the electronic control unit 108 determines whether the speed is above a maximum speed value of the speed range. For example, the data analyzer 206 monitors the speed of the vehicle 102 and determines whether the speed of the vehicle 102 is above the maximum speed of the speed range at any point while downhill snub braking mode is activated. When the speed is above the maximum speed value of the speed range, control proceeds to program 400 shown in connection with FIG. 4A. If the speed of the vehicle does not exceed the maximum speed value of the speed range, control proceeds to block 314.

At block 314, the electronic control unit 108 determines whether the speed is within a first threshold speed value of the maximum value of the speed range. For example, the data analyzer 206 determines a threshold speed within the speed range for which a snub braking event is to be initiated (e.g., discussed further in connection with FIG. 4A). The data analyzer 206 further determines whether the speed of the vehicle 102 is between the first threshold value and the maximum speed of the speed range. When the data analyzer 206 determines that the speed is within the first threshold and the maximum speed, control of the program 300 proceeds to the program 400 shown in connection with FIG. 4A. On the other hand, if the speed is determined to be below the first threshold, control proceeds to block 316.

At block 316, the electronic control unit 108 determines whether the speed of the vehicle 102 is between the minimum speed of the speed range and the first threshold value. For example, the data analyzer 206 determines when the speed is below the first threshold but above the minimum speed of the speed range (e.g., within the speed range but below the speed at which a snub braking event is to be initiated). When the data analyzer 206 determines that the speed is between the minimum speed and the first threshold value, control proceeds to example program 412 shown in connection with FIG. 4B. However, if the speed is determined to be below the minimum speed of the speed range (e.g., the speed does not fit within one of the categories described in blocks 312-316), control proceeds to block 318. In some alternative examples, deadbands (e.g., a speed and/or speed range for which the electronic control unit 108 takes no action) exist for predetermined speeds and/or speed ranges between the minimum speed and the first threshold value. In some such examples, the electronic control unit 108 does not proceed to example program 412 or block 318, but returns to block 310 to monitor the speed of the vehicle 102 when vehicle speed is within a deadband.

At block 318, the electronic control unit 108 increases the speed of the vehicle 102 until the speed reaches the minimum speed of the speed range. For example, when the data analyzer 206 determines that the speed of the vehicle 102 is below the minimum speed of the speed range, the data analyzer 206 instructs the speed adjustor 208 to accelerate the vehicle 102 (e.g., using the throttle) until the speed reaches the minimum speed of the speed range. Thus, when the speed of the vehicle 102 is below the speed range set by the target speed determiner 204, the electronic cruise controller 110 operates as a standard cruise control. In some alternative examples, the electronic control unit 108 determines that the speed of the vehicle 102 should not increase based on input from another system of the vehicle 102 (e.g., a GPS). For example, when the GPS determines that the vehicle 102 is approaching a large downhill, the electronic control unit 108 does not accelerate up a minor grade (e.g., the speed of the vehicle 102 can decrease below the minimum speed of the speed range).

At block 320, the electronic control unit 108 determines whether the vehicle 102 is still driving on the grade 106. For example, the grade analyzer 212 determines when the grade 106 is no longer present and/or no longer substantial (e.g., not steep). In some examples, the grade analyzer 212 supplies continuous grade information to the data analyzer 206. In such examples, the data analyzer 206 determines when the vehicle 102 no longer needs downhill snub braking mode activated based on the grade information. When vehicle is determined to still be driving on the grade 106, control returns to block 310 where the speed of the vehicle 102 is monitored. If, on the other hand, the vehicle 102 is no longer driving on the grade 106, control 300 proceeds to block 322.

At block 322, the electronic control unit 108 ramps out of downhill snub braking mode. For example, when the vehicle 102 is determined to no longer need downhill snub braking mode activated (e.g., because the vehicle 102 is no longer traveling on a grade), the electronic cruise controller 110 returns to standard cruise control operation. In transitioning, the electronic cruise controller 110 ramps (e.g., avoids abrupt changes in vehicle speeds) the speed of the vehicle to the target speed set at block 306.

At block 324, the electronic control unit 108 determines whether the vehicle 102 is still in operation. For example, the electronic control unit 108 ceases operation when the vehicle is no longer in operation (e.g., no longer running), but continues to monitor grade information if the vehicle remains operational. When the vehicle is determined to be in operation, control returns to block 302 where the program 300 determines whether the vehicle is traveling on a grade. However, when the vehicle is determined to no longer be operating, the program 300 concludes.

FIG. 4A is a flowchart representative of machine readable instructions that may be executed to implement the example electronic control unit 108 of FIGS. 1-2 to perform a snub braking event. The example program 300 of FIG. 3 causes the operations of FIG. 4A when the speed of a vehicle (e.g., the vehicle 102 of FIG. 1) is above a maximum speed of a speed range (e.g., set in block 308 of FIG. 3) or is between a first threshold speed value and the maximum speed (e.g., first threshold speed set in block 314 of FIG. 3). In such examples, the speed of the vehicle 102 is determined to be above an acceptable speed for traveling downhill and a braking system of the vehicle 102 is used to decelerate the vehicle 102 to an acceptable speed.

The example program 400 begins at block 402 where the electronic control unit 108 initiates a snub braking event. For example, the data analyzer 206 instructs the brake applier 220 of FIG. 2 to apply snub braking based on the speed of the vehicle 102. The brake applier 220 applies a forceful (e.g., 0.25 g) braking event using the braking system to decrease the speed of the vehicle.

At block 404, the electronic control unit 108 determines whether the vehicle speed is within a second threshold speed value of the minimum speed of the speed range. For example, the data analyzer 206 determines a second threshold speed value above the minimum speed of the speed range. In some examples, the second threshold speed value is lower than the first threshold speed value determined at block 314 of FIG. 3. The second threshold speed value is determined by the data analyzer 206 to be a value at which the electronic cruise controller 110 can ramp out of the snub braking until the minimum speed of the speed range is reached (e.g., as described in connection with block 410). The data analyzer 206 monitors the speed of the vehicle 102 to determine when the speed is below the second threshold speed value (e.g., between the minimum speed of the speed range and the second threshold speed value). When the speed is within the second threshold speed value of the minimum speed of the speed range, control proceeds to block 410. On the other hand, if the speed is above the second threshold speed value, control proceeds to block 406.

At block 406, the electronic control unit 108 determines whether the transmission can downshift into a next lower gear at the current speed. For example, the data analyzer 206 determines whether the current speed of the vehicle 102 is such that the transmission adjustor 216 of FIG. 2 can cause the transmission of the vehicle 102 to shift into a lower gear. The data analyzer 206 determines that if the transmission is capable of downshifting into a lower gear that the snub braking event has lowered the vehicle speed sufficiently. When the data analyzer 206 determines that the transmission can shift into a lower gear, control proceeds to block 410. However, control instead proceeds to block 408 when the transmission cannot shift into a lower gear.

At block 408, the electronic control unit 108 continues to apply the snub braking. For example, the data analyzer 206 determines that if the criteria of blocks 404 and 406 have not been met, the brake applier 220 is to continue applying the snub braking event to decelerate the vehicle 102. Once the criteria of either block 404 or 406 is met, control of program 400 would proceed to block 410.

At block 410, the electronic control unit 108 ramps out of the snub braking event until speed reaches the minimum speed of the speed range. For example, the brake applier 220 gradually decreases the braking forces exerted as the speed of the vehicle 102 continues to approach the minimum speed of the speed range. In some examples, the braking event begins as a 0.25 g braking event and decreases until reaching 0 g (e.g., no braking from the braking system) as the speed reaches the minimum speed of the speed range. When the speed of the vehicle 102 reaches the minimum speed of the speed range, the program 400 concludes and control returns to block 320 of FIG. 3.

FIG. 4B is a flowchart representative of machine readable instructions that may be executed to implement the example electronic control unit 108 of FIGS. 1-2 to decelerate the example vehicle of FIG. 1 using the example electronic powertrain controller of FIGS. 1-2. The example program 412 of FIG. 4B is executed when the speed of a vehicle (e.g., the vehicle 102 of FIG. 1) is above the minimum speed of the speed range and the electronic control unit 108 determines that engine braking is to be used to cause a deceleration of the vehicle 102.

The program 412 begins at block 414 where the electronic control unit 108 initiates engine fuel cutoff. For example, the data analyzer 206 instructs the engine adjustor 214 to cut off fuel to the engine to cause engine braking, thus generating a retarding force that decelerates the vehicle 102. In some examples, engine braking can be activated as described in connection with FIG. 2. Additionally or alternatively, the engine braking can be caused by other engine braking methods (e.g., a Jake Brake®, etc.)

At block 416, the electronic control unit 108 determines whether it is possible for a transmission of the vehicle 102 to downshift at the current speed of the vehicle. For example, the data analyzer 206 monitors the speed of the vehicle 102 and determines whether the transmission adjustor 216 of FIG. 2 can downshift the transmission to cause further engine braking. When the data analyzer 206 determines that a downshift is possible, control proceeds to block 418. However, if the data analyzer 206 determines that a downshift is not possible, the program 412 concludes and control returns to block 320 of FIG. 3.

At block 418, the electronic control unit 108 downshifts the transmission. For example, the transmission adjustor 216 causes a downshift in the transmission of the vehicle 102 when instructed by the data analyzer 206. When the transmission has been downshifted, the program 412 concludes and control returns to block 320 of FIG. 3.

Figure 5:
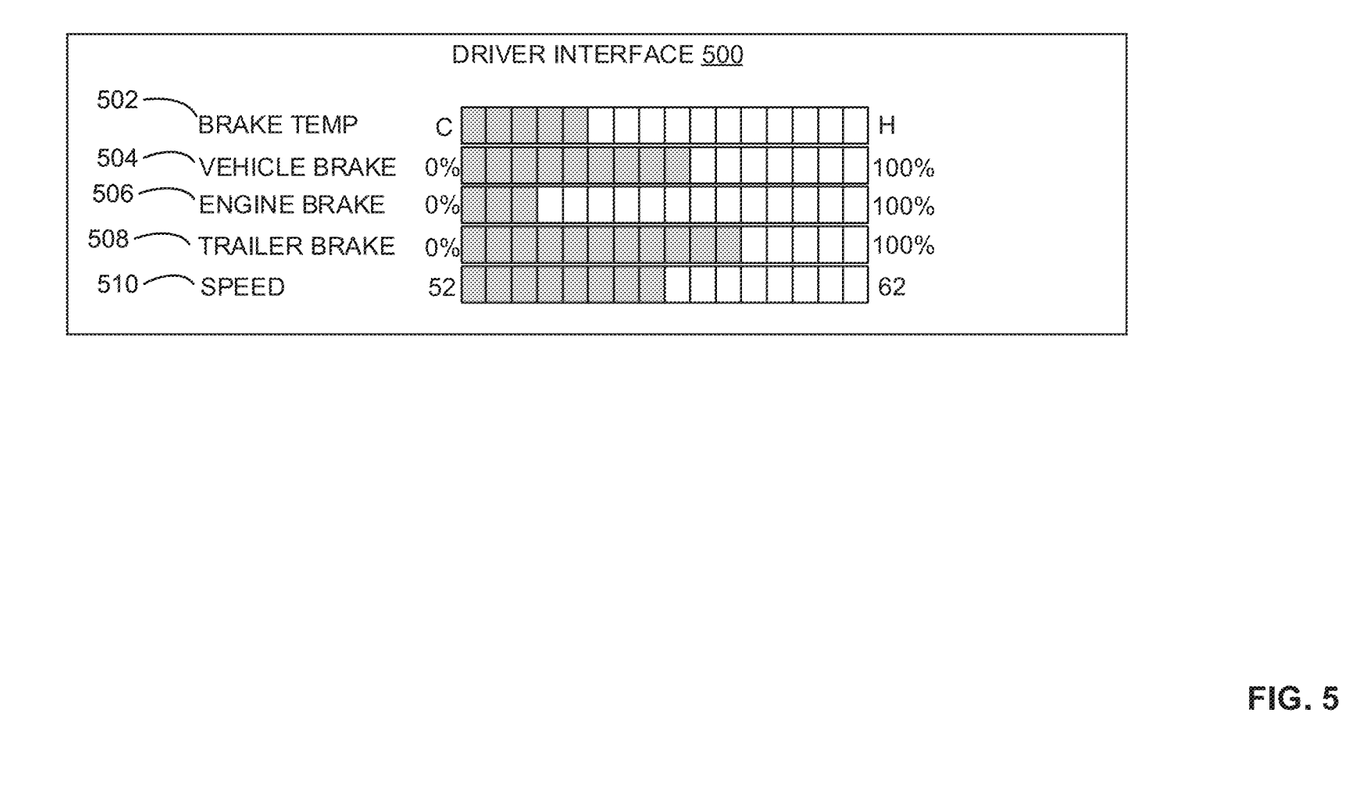
FIG. 5 is an example driver interface that may be implemented to display the characteristics of the example vehicle of FIG. 1.

FIG. 5 is an example driver interface 500 that may be implemented to display the characteristics of the example vehicle 102 of FIG. 1. The driver interface 500 of the illustrated example includes information that a driver of the vehicle 102 can use to monitor a braking system, including a brake temperature parameter 502, a vehicle brake parameter 504, an engine brake parameter 506, a trailer brake parameter 508, and a speed parameter 510. Additionally or alternatively, the driver interface 500 includes other parameters, such as grade (e.g., the grade 106 of FIG. 1), current gear of a transmission, braking torque, etc. The driver interface 500 of the illustrated example displays the parameters 502-510 as percentages. Additionally or alternatively, the display 500 can display the parameters 502-510 as units of torque, force, temperature, etc.

The example brake temperature parameter 502 displays the brake temperature of the vehicle brakes during operation. In some examples, the brake temperature parameter 502 displays a range of temperatures between a resting temperature (e.g., a temperature when the vehicle 102 is not in operation, a minimum temperature, etc.) and a maximum temperature. In some such examples, the maximum temperature indicates a temperature that should not be exceeded (e.g., a temperature that may damage the brakes) during operation of the vehicle 102. In some examples, the brake temperature parameter 502 of the driver interface 500 includes a numerical value displaying the current temperature of the brakes. In some examples, the brake temperature parameter 502 includes a display of brake temperature information associated with each wheel of the vehicle 102. In some examples, when a trailer is attached to the vehicle 102, the brake temperature parameter 502 further displays a brake temperature of the trailer braking system.

The example vehicle brake parameter 504 of the driver interface 500 indicates a percentage of brake capacity that is currently being used by the vehicle 102. For example, a vehicle brake parameter 504 of 50% indicates that the vehicle 102 (e.g., a truck) is using 50% of its total braking capacity in attempting to slow the vehicle 102 down. Thus, the vehicle 102 is capable of providing twice as much braking force to slow the vehicle down using the vehicle braking system as is currently being provided. In another example, if the vehicle 102 is using only one fourth of the total braking capability of the vehicle braking system, the vehicle brake parameter 504 displays a value of 25%. In some examples, the vehicle brake parameter 504 is displayed as a torque or force value (e.g., instead of a percentage).

The example engine brake parameter 506 of the driver interface 500 indicates a level of engine braking from an engine of the vehicle 102. The engine brake parameter 506 quantifies the engine braking exerted by the vehicle 102 as a percentage of total possible engine braking that the vehicle 102 is capable of producing. For example, an engine braking parameter 506 of 25% indicates that the engine braking is supplying a retarding force that is one fourth of the maximum amount of force that can possibly be supplied via engine braking. In another example, the engine braking parameter 506 displays an increase in the percentage of engine braking if the vehicle 102 downshifts into a lower gear (e.g., to produce more engine braking). This is possible when the vehicle 102 reaches a lower speed that enables downshifting of the transmission, for example. In some examples, the engine braking parameter 506 is displayed as a value of torque or force (e.g., instead of a percentage).

The example trailer brake parameter 508 of the driver interface 500 indicates a level of braking of a braking system of a trailer attached to the vehicle 102. In some examples, a trailer is not attached to the vehicle 102, and the trailer brake parameter 508 is not displayed in the driver interface 500. The trailer brake parameter 508 displays a percentage of a total amount of braking that can be applied by the trailer braking system (e.g., a maximum amount of trailer braking being 100%). For example, a trailer brake parameter 508 having a value of 75% indicates that the trailer brakes are exerting 75% of the maximum amount of braking possible. In some examples, the trailer brake parameter 508 is displayed as a value of torque or force (e.g., instead of a percentage).

The example speed parameter 510 of the driver interface 500 indicates a current speed of the vehicle 102. The speed parameter 510 further includes the speed range determined by the target speed determiner 204 of FIG. 2. In some examples, the speed parameter 510 further numerically displays the current speed of the vehicle 102. In the illustrated example, the speed parameter 510 displays a minimum speed of the speed range (e.g., 52 mph), a maximum speed of the speed range (e.g., 62 mph), and the current speed of the vehicle 102 (e.g., approximately 57 mph). The driver of the vehicle can thus determine whether the speed of the vehicle 102 is safely within the speed range or, for example, nearing the maximum speed of the speed range.

In some examples, the driver of the vehicle 102 uses the driver interface 500 to monitor the performance of the vehicle 102 while traveling on a grade (e.g., the grade 106). For example, the driver can determine whether the brakes are reaching temperatures that are too high (e.g., using the brake temperature parameter 502). In other examples, the driver can determine whether the vehicle braking, engine braking, and/or trailer braking are exerting too much or too little braking force to slow down the vehicle 102. In further examples, the driver can determine whether the speed of the vehicle 102 is approaching the maximum speed.

Figure 6:
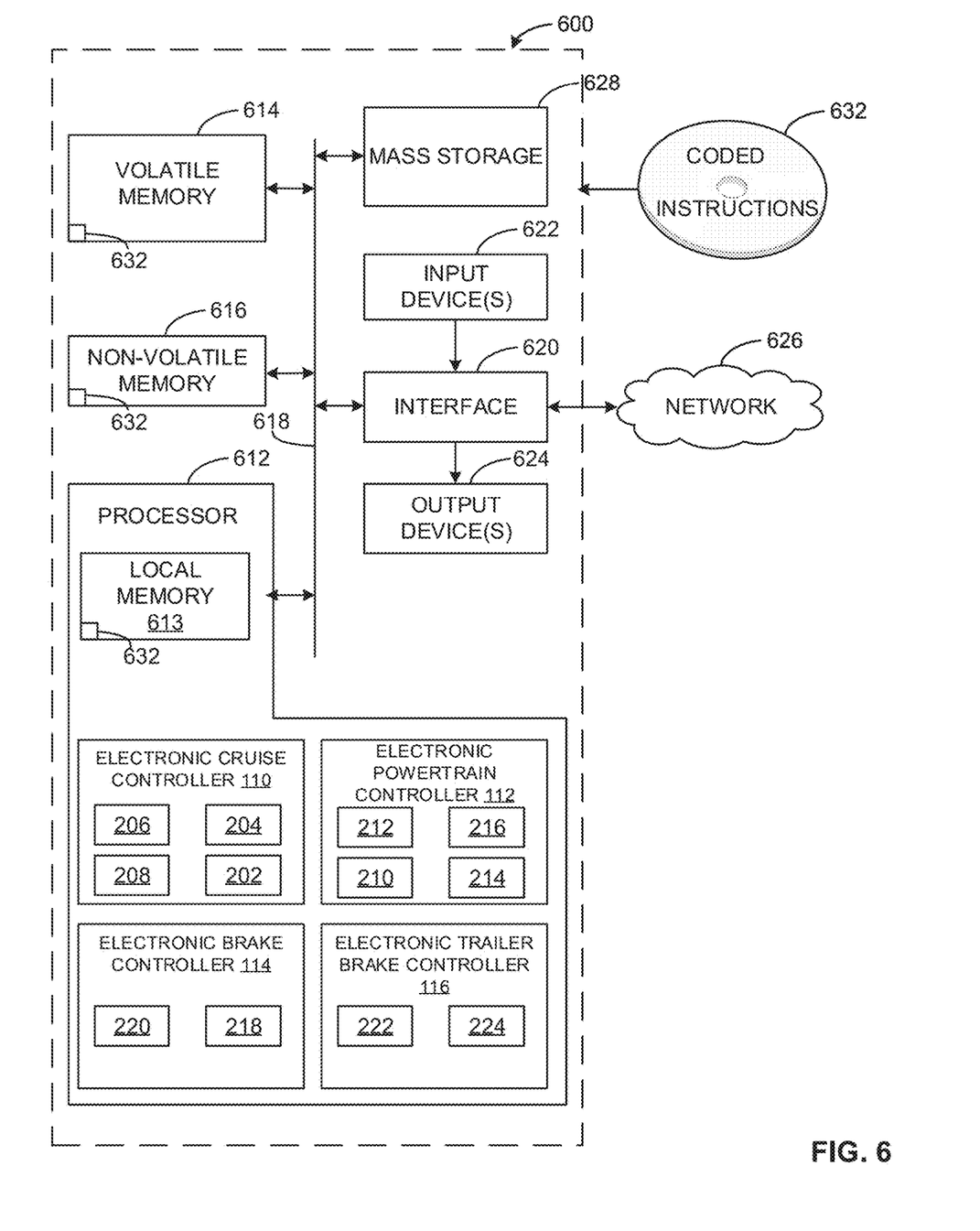
FIG. 6 is a block diagram of an example processing platform structured to execute the instructions of FIGS. 3-4B to implement the example controller of FIGS. 1-2.

FIG. 6 is a block diagram of an example processor platform 600 structured to execute the instructions of FIGS. 3-4B to implement the electronic control unit 108 of FIGS. 1-2. The processor platform 600 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, or any other type of computing device.

The processor platform 600 of the illustrated example includes a processor 612. The processor 612 of the illustrated example is hardware. For example, the processor 612 can be implemented by one or more integrated circuits, logic circuits, microprocessors, GPUs, DSPs, or controllers from any desired family or manufacturer. The hardware processor may be a semiconductor based (e.g., silicon based) device. In this example, the processor implements the example electronic cruise controller 110, the example electronic powertrain controller 112, the example electronic brake controller 114, the example electronic trailer brake controller 116, the example cruise control interface 202, the example target speed determiner 204, the example data analyzer 206, the example speed adjustor 208, the example powertrain interface 210, the example grade analyzer 212, the example engine adjustor 214, the example transmission adjustor 216, the example vehicle brake interface 218, the example brake applier 220, the example trailer brake interface 222, and the example trailer brake applier 224.

The processor 612 of the illustrated example includes a local memory 613 (e.g., a cache). The processor 612 of the illustrated example is in communication with a main memory including a volatile memory 614 and a non-volatile memory 616 via a bus 618. The volatile memory 614 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 616 may be implemented by flash memory and/or any other desired type of memory device. Access to the main memory 614, 616 is controlled by a memory controller.

The processor platform 600 of the illustrated example also includes an interface circuit 620. The interface circuit 620 may be implemented by any type of interface standard, such as a controller area network (CAN), an Ethernet interface, a universal serial bus (USB), a Bluetooth® interface, a near field communication (NFC) interface, and/or a PCI express interface.

In the illustrated example, one or more input devices 622 are connected to the interface circuit 620. The input device(s) 622 permit(s) a user to enter data and/or commands into the processor 612. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 624 are also connected to the interface circuit 620 of the illustrated example. The output devices 624 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer and/or speaker. The interface circuit 620 of the illustrated example, thus, typically includes a graphics driver card, a graphics driver chip and/or a graphics driver processor.

The interface circuit 620 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 626. The communication can be via, for example, an Ethernet connection, a digital subscriber line (DSL) connection, a telephone line connection, a coaxial cable system, a satellite system, a line-of-site wireless system, a cellular telephone system, etc.

The processor platform 600 of the illustrated example also includes one or more mass storage devices 628 for storing software and/or data. Examples of such mass storage devices 628 include floppy disk drives, hard drive disks, compact disk drives, Blu-ray disk drives, redundant array of independent disks (RAID) systems, and digital versatile disk (DVD) drives.

The machine executable instructions 632 of FIGS. 3-4B may be stored in the mass storage device 628, in the volatile memory 614, in the non-volatile memory 616, and/or on a removable non-transitory computer readable storage medium such as a CD or DVD.

From the foregoing, it will be appreciated that example methods, apparatus and articles of manufacture have been disclosed that initiate automatic downhill snub braking. In some examples, engine braking is initiated by cutting off fuel to the engine of the vehicle and downshifting a transmission of the vehicle. The use of engine braking reduces the exertion of the braking system (e.g., friction brakes) needed to decelerate the vehicle, thus reducing the temperature of the brakes. Further, examples disclosed herein automatically initiate snub braking events that decelerate the vehicle to a specified speed. The snub braking events have a short duration and do not increase the temperature of the braking system substantially because the brakes are given time to cool down between snub braking events. The automated downhill snub braking maintains a reduced braking temperature throughout travel of the vehicle on a grade (e.g., a downhill) that allows the brakes to work properly throughout operation. Thus, examples disclosed herein reduce damage to braking systems and/or increase braking effectiveness because the braking system is maintained at a low temperatures throughout operation of the vehicle.

Example 1 includes an apparatus comprising an electronic powertrain controller to cause a deceleration of a vehicle in response to a first request from an electronic cruise controller, the first request responsive to a change in grade of a driving surface and an electronic brake controller to apply snub braking to the vehicle in response to a second request received from the electronic cruise controller, the second request responsive to a speed of the vehicle reaching a maximum speed.

Example 2 includes the apparatus of example 1 wherein the electronic powertrain controller is to cause the deceleration of the vehicle via engine fuel cutoff, engine braking, or a transmission downshift.

Example 3 includes the apparatus of example 1, wherein the snub braking includes applying a constant deceleration using a braking system of the vehicle until the speed of the vehicle equals a minimum speed.

Example 4 includes the apparatus of example 3, wherein the electronic brake controller controls operation of the braking system of the vehicle and a braking system of a trailer attached to the vehicle.

Example 5 includes the apparatus of example 4, wherein the snub braking includes using the braking system of the vehicle and the braking system of the trailer attached to the vehicle.

Example 6 includes the apparatus of example 1, further including a display interface to display characteristics of the vehicle to a driver.

Example 7 includes the apparatus of example 6, wherein the display interface displays one or more of the grade of the driving surface, brake temperature, an output level of a braking system, an output level of a braking system of a trailer, or an operational speed range.

Example 8 includes the apparatus of example 3, wherein the minimum speed is determined based on a maximum grade downshift velocity calculated by the electronic powertrain controller.

Example 9 includes a method comprising determining a maximum speed and a minimum speed of a vehicle traveling on a grade, the minimum speed determined based on a maximum grade downshift velocity, causing a deceleration of a vehicle via a powertrain of the vehicle when a speed of the vehicle is within a first threshold value of the minimum speed, and applying a snub braking to the vehicle using a braking system of the vehicle when the speed of the vehicle is within a second threshold of the maximum speed.

Example 10 includes the method of example 9, wherein the powertrain causes the deceleration of the vehicle via engine fuel cutoff or a transmission downshift.

Example 11 includes the method of example 9, wherein the maximum grade downshift velocity is calculated by an electronic cruise controller based on the grade and indicates a maximum speed at which the powertrain can shift a transmission into a lower gear.

Example 12 includes the method of example 9, wherein the snub braking includes applying a constant deceleration until the speed of the vehicle equals a minimum speed.

Example 13 includes the method of example 12, wherein the snub braking is applied by the braking system of the vehicle and a braking system of a trailer attached to the vehicle.

Example 14 includes the method of example 9, further including displaying one or more of the grade, brake temperature, an output level of a vehicle braking system, an output level of a braking system of a trailer, or an operational speed range to a driver via a display interface Example 15 includes a tangible computer readable storage medium comprising instructions that, when executed, cause a machine to at least cause a deceleration using a powertrain of a vehicle in response to a change in grade of a driving surface and apply a snub braking to the vehicle via a braking system of the vehicle in response to the vehicle reaching a maximum speed.

Example 16 includes the tangible computer readable storage medium of example 15, wherein the powertrain causes the deceleration of the vehicle via engine fuel cutoff, engine braking, or a transmission downshift.

Example 17 includes the tangible computer readable storage medium of example 15, wherein the snub braking includes applying a constant deceleration until the speed of the vehicle equals a minimum speed.

Example 18 includes the tangible computer readable storage medium of example 17, wherein the snub braking is applied by the braking system of the vehicle and a braking system of a trailer attached to the vehicle.

Example 19 includes the tangible computer readable storage medium of example 15, wherein the instructions further cause the machine to display characteristics of the vehicle to a driver using a display interface.

Example 20 includes the tangible computer readable storage medium of example 19, wherein the display interface displays one or more of the grade of the driving surface, brake temperature, an output level of a vehicle brake system, an output level of brake system of a trailer, or an operational speed range.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. An apparatus comprising:
   an electronic powertrain controller configured to cause a deceleration of a vehicle in response to a first request from an electronic cruise controller, the first request responsive to a change in grade of a driving surface;
   an electronic brake controller configured to apply snub braking to the vehicle in response to a second request received from the electronic cruise controller, the second request responsive to a speed of the vehicle reaching a maximum speed; and
   an electronic cruise controller configured to ramp out of the snub braking in response to determining at least one of (1) a transmission of the vehicle is able to downshift or (2) the speed of the vehicle reaching a minimum speed.

2. The apparatus of claim 1, wherein the electronic powertrain controller is configured to cause the deceleration of the vehicle via engine fuel cutoff, engine braking, or a transmission downshift.

3. The apparatus of claim 1, wherein the snub braking includes applying a constant deceleration using a braking system of the vehicle until the speed of the vehicle equals the minimum speed.

4. The apparatus of claim 3, wherein the electronic brake controller controls operation of the braking system of the vehicle and a braking system of a trailer attached to the vehicle.

5. The apparatus of claim 4, wherein the snub braking includes using the braking system of the vehicle and the braking system of the trailer attached to the vehicle.

6. The apparatus of claim 1, further including a display interface to display characteristics of the vehicle to a driver.

7. The apparatus of claim 6, wherein the display interface displays one or more of the grade of the driving surface, brake temperature, an output level of a braking system, an output level of a braking system of a trailer, or an operational speed range.

8. The apparatus of claim 3, wherein the minimum speed is determined based on a maximum grade downshift velocity calculated by an electronic cruise controller.

9. A method comprising:
   determining a maximum speed and a minimum speed of a vehicle traveling on a grade, the minimum speed determined based on a maximum grade downshift velocity;
   causing a deceleration of a vehicle via a powertrain of the vehicle when a speed of the vehicle is within a first threshold value of the minimum speed;
   applying snub braking to the vehicle using a braking system of the vehicle when the speed of the vehicle is within a second threshold of the maximum speed; and
   ramping out of the snub braking in response to determining at least one of (1) a transmission of the vehicle is able to downshift or (2) the vehicle reaching the minimum speed.

10. The method of claim 9, wherein the powertrain causes the deceleration of the vehicle via engine fuel cutoff or a transmission downshift.

11. The method of claim 9, wherein the maximum grade downshift velocity is calculated by an electronic cruise controller based on the grade and corresponds to a maximum speed at which the powertrain can shift a transmission into a lower gear.

12. The method of claim 9, wherein the snub braking includes applying a constant deceleration until the speed of the vehicle equals a minimum speed.

13. The method of claim 12, wherein the snub braking is applied by the braking system of the vehicle and a braking system of a trailer attached to the vehicle.

14. The method of claim 9, further including displaying one or more of the grade, brake temperature, an output level of a vehicle braking system, an output level of a braking system of a trailer, or an operational speed range to a driver via a display interface.

15. A non-transitory computer readable storage medium comprising instructions that, when executed, cause a machine to at least:

cause a deceleration using a powertrain of a vehicle in response to a change in grade of a driving surface;

apply a snub braking to the vehicle via a braking system of the vehicle in response to the vehicle reaching a maximum speed; and ramp out of the snub braking in response to determining at least one of (1) a transmission of the vehicle is able to downshift or (2) the vehicle reaching a minimum speed.

16. The non-transitory computer readable storage medium of claim 15, wherein the powertrain causes the deceleration of the vehicle via engine fuel cutoff, engine braking, or a transmission downshift.

17. The non-transitory computer readable storage medium of claim 15, wherein the snub braking includes applying a constant deceleration until a speed of the vehicle equals the minimum speed.

18. The non-transitory computer readable storage medium of claim 17, wherein the snub braking is applied by the braking system of the vehicle and a braking system of a trailer attached to the vehicle.

19. The non-transitory computer readable storage medium of claim 15, wherein the instructions further cause the machine to display characteristics of the vehicle to a driver using a display interface.

20. The non-transitory computer readable storage medium of claim 19, wherein the display interface displays one or more of the grade of the driving surface, brake temperature, an output level of a vehicle brake system, an output level of brake system of a trailer, or an operational speed range.

\* \* \* \* \*